(12) United States Patent
Branch et al.

(10) Patent No.: US 8,909,749 B2
(45) Date of Patent: Dec. 9, 2014

(54) PREDICTIVE CONTEXT-BASED VIRTUAL WORKSPACE PLACEMENT

(75) Inventors: Joel W. Branch, Hamden, CT (US); Douglas M. Freimuth, New York, NY (US); Bong Jun Ko, Harrington Park, NJ (US); Vasileios Pappas, Elmsford, NY (US)

(73) Assignee: International Business Macines Corporation, Armonk, NY (US)

( * ) Notice: Subject to any disclaimer, the term of this patent is extended or adjusted under 35 U.S.C. 154(b) by 773 days.

(21) Appl. No.: 12/843,686

(22) Filed: Jul. 26, 2010

(65) Prior Publication Data

US 2012/0023223 A1    Jan. 26, 2012

(51) Int. Cl.
*G06F 15/173* (2006.01)
*G06F 9/48* (2006.01)
(52) U.S. Cl.
CPC .................................... *G06F 9/4856* (2013.01)
USPC ............................ 709/223; 709/217; 709/226
(58) Field of Classification Search
USPC .................. 709/224, 226, 217, 219, 220, 223
See application file for complete search history.

(56) References Cited

U.S. PATENT DOCUMENTS

| 6,125,278 | A  | * | 9/2000  | Wieczorek et al. ........... 455/437 |
| 6,879,838 | B2 | * | 4/2005  | Rankin et al. .............. 455/456.6 |
| 6,973,465 | B2 |   | 12/2005 | Kuzmin |
| 7,395,370 | B2 |   | 7/2008  | Ukai et al. |
| 7,610,365 | B1 | * | 10/2009 | Kraft et al. ..................... 709/223 |
| 7,970,017 | B2 | * | 6/2011  | O'Neil .......................... 370/503 |
| 2002/0198991 | A1 | * | 12/2002 | Gopalakrishnan et al. ... 709/225 |
| 2004/0260862 | A1 |   | 12/2004 | Anderson |
| 2008/0034019 | A1 | * | 2/2008  | Cisler et al. .................... 707/204 |
| 2008/0086750 | A1 | * | 4/2008  | Yasrebi et al. .................. 725/86 |
| 2008/0140840 | A1 | * | 6/2008  | Hamilton et al. ............. 709/226 |
| 2009/0187540 | A1 |   | 7/2009  | Richardson et al. |
| 2009/0307597 | A1 |   | 12/2009 | Bakman |
| 2010/0257269 | A1 | * | 10/2010 | Clark ............................ 709/226 |

* cited by examiner

*Primary Examiner* — Jimmy H Tran
(74) *Attorney, Agent, or Firm* — Thomas Grzesik; Fleit Gibbons Gutman Bongini & Bianco PL

(57) ABSTRACT

A method, information processing system, and computer program product manage virtual workspace migration. A set of information associated with a user is analyzed. A future virtual workspace demand associated with the user is predicted based on the analyzing. At least a portion of at least one virtual workspace associated with the user is migrated from a first location to at least a second location based on the future virtual workspace demand that has been predicted.

20 Claims, 5 Drawing Sheets

| USERS | USER LOCATIONS 306 | PROJECTS 312 | USER AFFLICTIONS 318 | UTILIZED LOCATIONS 324 | KEYWORDS 334 | ... |
|---|---|---|---|---|---|---|
| USER A 304 | NYC 308 | PROJECT 1 314 | USER B 320 | NYC 326 | TERM_A 336 | ... |
|  | LA 310 | PROJECT 3 316 | COMPANY C 322 | LA 328 | PHASE_A 338 | ... |
|  |  |  |  | CHICAGO 330 |  | ... |
|  |  |  |  | LONDON 332 |  | ... |
|  | ... | ... | ... |  |  | ... |
|  | ... | ... | ... |  |  | ... |

PREDICTIVE CONTEXT-BASED VIRTUAL WORKSPACE PLACEMENT

FIELD OF THE INVENTION

The present invention generally relates to virtual workspaces, and more particularly relates to managing the migration of virtual workspaces.

BACKGROUND OF THE INVENTION

Cloud computing and related data center technologies will increasingly offer a low maintenance and transparent method of remotely storing, accessing, and maintaining personal computer workspaces. Examples include software development environments and other project-related workspaces that are either too resource-intensive for or natively incompatible with one's personal computing device, which has quickly grown to include "thin clients" such as smartphones and netbooks. In many cases, users are either explicitly maintaining "multiple" computer workspaces (e.g., one for a coding project, one for a research project, one for media management, etc.) or engage in day-to-day computing activities that can easily be classified under different workspaces. This further increases the attraction of using the cloud model for workspace maintenance since it allows a transparent way of maintaining multiple workspaces without worrying about stressing the resources of the personal machine.

With respect to migrating workspaces across different datacenters, conventional migration methods encounter various challenges. For instance, for users who maintain large resource-intensive workspaces in the cloud, on-demand migration can be an insufficient proposition. The major reason is that workspace migration can take an extensive amount of time depending on the size of the workspace, network link congestion, and physical distance of migration. Also, on-demand migration might not provide the best "global" migration decision for a cloud environment, i.e., a decision that considers workspace migrations of "all" users of the system at any given time. Finally, manually determining what workspace(s) to migrate and where to migrate it (or them) can be rather inconvenient on the part of the user.

SUMMARY OF THE INVENTION

In one embodiment, a method for managing virtual workspace migration is disclosed. The method comprises analyzing a set of information associated with a user. A future virtual workspace demand associated with the user is predicted based on the analyzing. At least one portion of at least one virtual workspace associated with the user is migrated from a first location to at least a second location based on the future virtual workspace demand that has been predicted.

In another embodiment, an information processing system for managing virtual workspace migration is disclosed. The information processing system comprises a memory and a processor communicatively coupled to the memory. A virtual workspace migration manager is communicatively coupled to the memory and the processor. The virtual workspace migration manager is adapted to analyze a set of information associated with a user. A future virtual workspace demand associated with the user is predicted based on the analyzing. At least one portion of at least one virtual workspace associated with the user is migrated from a first location to at least a second location based on the future virtual workspace demand that has been predicted.

In yet another embodiment, a computer program product for managing virtual workspace migration is disclosed. The computer program product comprises a storage medium readable by a processing circuit and storing instructions for execution by the processing circuit for performing a method. The method comprises analyzing a set of information associated with a user. A future virtual workspace demand associated with the user is predicted based on the analyzing. At least one portion of at least one virtual workspace associated with the user is migrated from a first location to at least a second location based on the future virtual workspace demand that has been predicted.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a table showing one example of a workspace configuration according to one embodiment of the present invention;

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
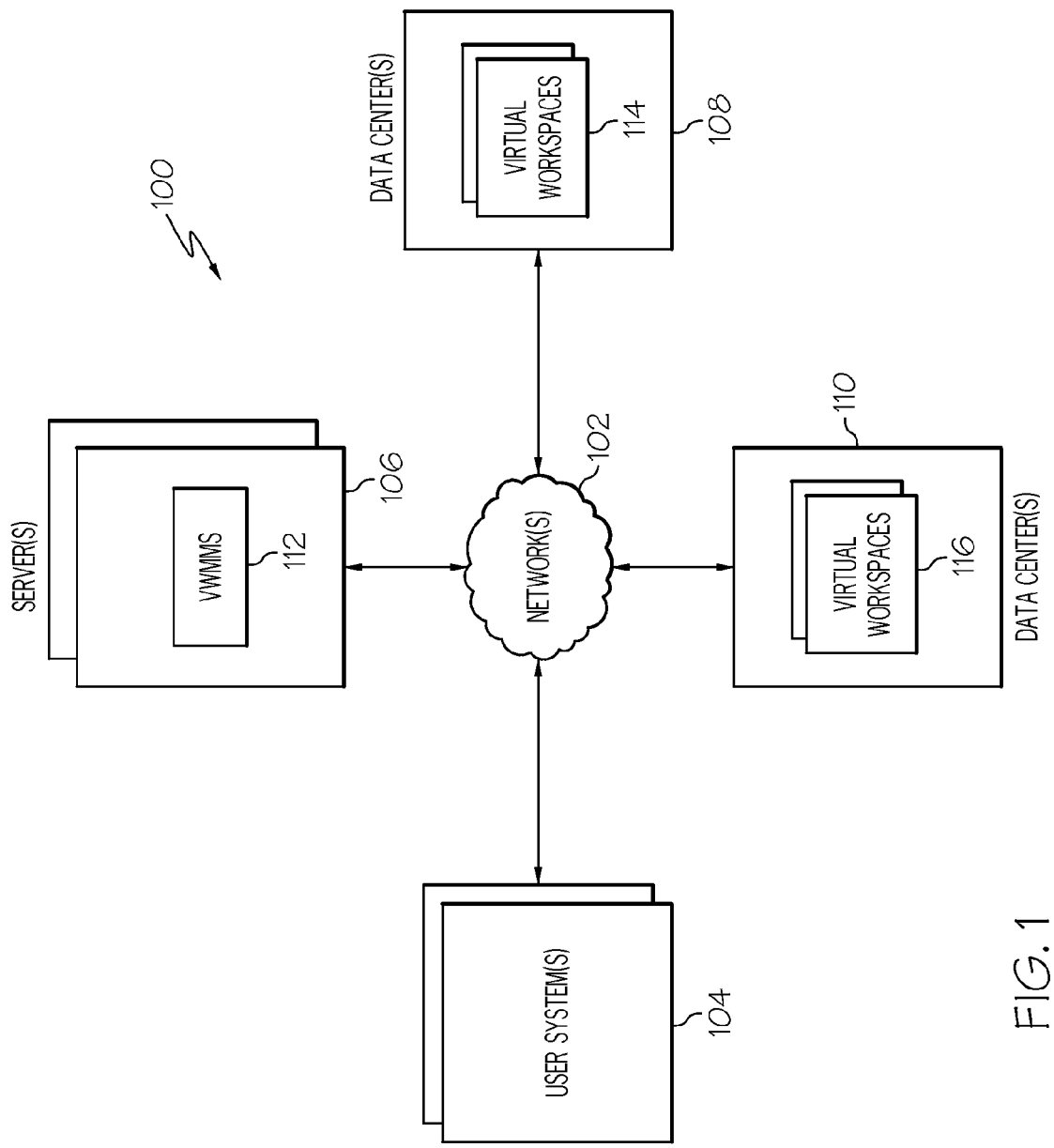
FIG. 1 is a block diagram illustrating one example of an operating environment according to one embodiment of the present invention.

According to one embodiment, FIG. 1 illustrates one example of an operating environment/system 100 for managing virtual workspace migration. FIG. 1 shows one or more networks 102 that, in one embodiment, are wide area networks, local area networks, wired networks, wireless networks, and/or the like. In one embodiment, the one or more networks 102 can comprise both a public network such as the Internet and a local network such as an intranet.

FIG. 1 also shows a plurality of information processing systems being communicatively coupled to the one or more networks 102. In particular, FIG. 1 shows one or more user information processing systems 104, one or more server systems 106, and one or more data centers 108, 110. The server 106 comprises a virtual workspace migration manager (VWMM) 112 that manages the migration of virtual workspaces from a first set of datacenters to a second set of datacenters. The datacenters 108, 110 comprises one or more virtual workspaces 114, 116 or are at least configured to host one or more virtual workspaces. A virtual workspace, in one embodiment, is an information processing system that is present in a virtual form within one or more other information processing system. This information processing system comprises the computing environments, such as virtual operating system and virtual hardware, the configuration of operating system and hardware, and user data, specific and/or personalized for a user.

The VWMM 112, in one embodiment, performs predictive migration of virtual workspaces across cloud environments based on a user's "predicted context". As will be discussed in greater detail below, the VWMM 112 predicts when and where a user will or may travel to and what workspace information the user may need in the future using information such as, but not limited to electronic schedule information (e.g., calendar entries, travel reservation databases, etc.), social networking information (project-based social ties, social network postings, blogs, etc.), location based information (e.g., VPN login information, GPS information, etc.), email information, messaging information, and the like. This information is then used by analytics engines to automatically determine when migration is to be performed, what workspace is to be migrated, and also to which data center the selected workspace is be migrated using network information such as network maps and network measurement data. This predictive migration process(es) is discussed in greater detail below.

The advantage of various embodiments of the present invention is that they exploit a user's predicted and current context information, which is now widely available in many enterprise IT systems, to make proactive and predictive judgments about virtual workspace migration. This allows for a more efficient migration system that does not burden the user for explicit input, as opposed to conventional migration systems that largely focus either solely on using current context for enabling data availability or on migrating contents commonly shared by a large number of users.

Predictive Context-Based Virtual Workspace Placement

Figure 2:
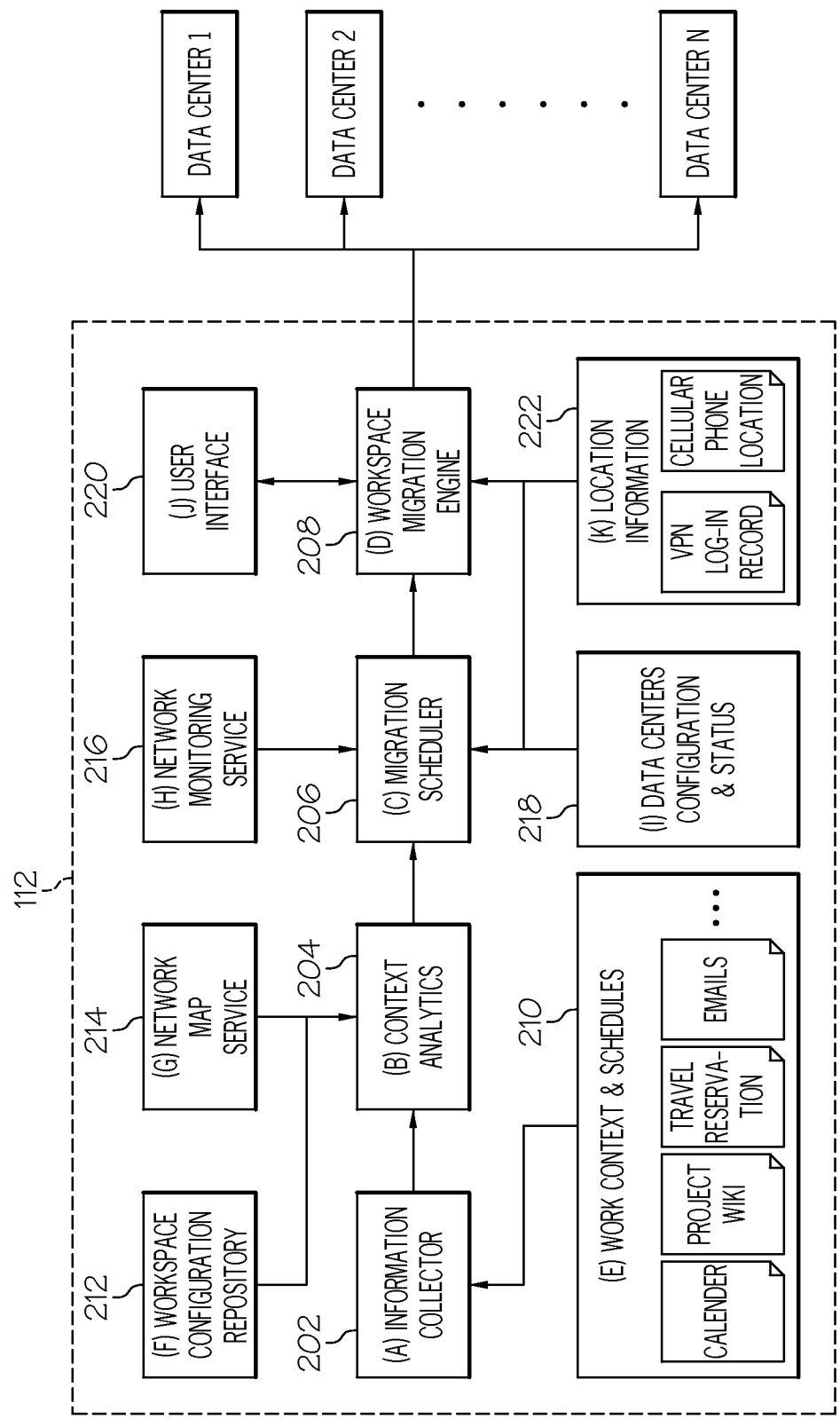
FIG. 2 is a block diagram showing a detailed view of a virtual workspace migration management system according to one embodiment of the present invention.

The following is a more detailed discussion on managing virtual machine migration using predictive context-based virtual workspace placement. FIG. 2 shows a more detailed view of the VWMM 112. In particular, FIG. 2 shows that the VWMM 112 comprises an information collector 202, a context analytics engine 204, a migration scheduler 206, a workspace migration engine 208, work context and schedule information 210, a workspace configuration repository 212, a network mapping module 214, a network monitoring module 216, data center configuration and status information 218, a user interface 220, and location information 222. It should be noted that all of these components can reside on a single sever 104 or one or more of these components can reside one or more different servers. It should be also noted that all of these components need not necessarily be present all together to enable the variations of the embodiments discussed herein; instead, a subset of these components can be coupled together to enable some of the embodiments.

The information collector 202, in one embodiment, collects information relevant to the context and schedule 210 of the user's usage pattern of workspaces. This can be implemented, for example, by a periodic information crawling agent that continually runs in the background to access and obtain the on-line information sources, such as user's calendar entries, project wiki, travel reservation, email exchange history, etc. This periodic information crawling agent can reside locally at the user's system 102, at the server 104, or at any other information processing system. The periodic information crawling agent either receives an identifier from the VWMM 112 or maintains a list of identifiers associated with each user of the VWMM 112. In an alternative embodiment, each user of the VWMM 112 is assigned a separate periodic information crawling agent.

The periodic information crawling agent periodically monitors the use of given workspace by a user and also analyzes various scheduling and contextual information sources to identify usage patterns of the given workspace. For example, the agent can search a user's calendar information 224, project wiki 226, travel reservation information 228, emails 230, instant messages, and the like to determine a work context and schedule for the given work space. By analyzing these sources (and other relevant sources) the crawling agent can identify the appointments, such as, but not limited to, meetings, that were scheduled when the user was utilizing the given workspace; the type of projects the user was working on when utilizing the workspace; any type of travel information that is associated with the time period where the user was utilizing the workspace; any emails/messages associated with the time period when the user was utilizing the workspace or associated with the project for which the workspace was utilized, or associated with any individual or entity for the project for which the workspace was utilized, or the like.

The collected information is then fed into the context analytics engine 204. The context analytics engine 204 analyzes this information collected by the information collector 202 and determines a context of the given workspace. For example, from the calendar information the context analytics engine 204 can determine that the user utilized the given workspace when he/she had a meeting at specific time/day with a specific group of people or entity, and that the meeting was respect to a given subject matter. From a project wiki the context analytics engine 204 can determine that the user utilizes this given workspace for a given project that comprises a given set of team members that reside at one or more given locations. From travel reservations the context analytics engine 204 can determine that a user traveled from location A to location B and then utilized the given workspace. Based on emails/messages the context analytics engine 204 can further determine when the user utilizes the workspace, for what the user utilizes the workspace, and with whom does the user work with when utilizing the workspace. It should be noted that these information sources and the information obtained from these sources are only used as an non-limiting example as other sources can be used and other information sets can be obtained.

The context analytics engine 204 then determines one or more workspace configurations 300 for a given workspace based upon this information. For example, FIG. 3 shows an illustrative representation of a configuration 300 that has been determined for a given workspace. The context of FIG. 3 associates users, user locations, projects, user affiliations, utilized locations, and keywords with a given workspace. For example, under a "User" column 302 an entry 304 comprises a user ID such as "User A" that indicates a given user that is associated with the given workspace. Then entries under this column 302 identify the user's that utilize this workspace.

A "User Locations" column 306 comprises entries 308, 310 that indicate locations associated with the user identified under the "User" column 302. For example, for User A, the "User Locations" column 306 indicates that User A is associated with New York City and Los Angeles. A "Projects/Meetings" column 312 comprises entries 314, 316 that identify the projects, meetings, and the like that User A has utilized the workspace for. For example, FIG. 3 shows that User has utilized the workspace for Project 1, Project 3, and Meeting A. A "User Affiliations" column 320 comprises entries 322, 324 that identify other users/entities that were associated with User A when User A either utilized the workspace and/or are associated with the projects/meetings listed under the "Projects/Meetings" column 312. For example, FIG. 3 shows that User A is also associated with User B and Company C.

A "Utilized Locations" column 326 comprises entries 328, 330 that identify the locations where the user has utilized the workspace. For example, FIG. 3 shows that the user utilized the workspace when the user was in New York City, Los Angeles, Chicago, and London. A "Keywords" column 332 comprises entries 334, 336 that identifies various keywords and/or phrases that are associated with the workspace. For example, FIG. 3 shows that the workspace is associated with "Term_A" and "Phrase_B". The context analytics engine 204 can utilize these keywords when searching through the information collected by the information collector 202 when predicting what workspace should be migrated and when/where the workspace should be migrated. For example, if the workspace is associated with a phrase "quarterly performance review" and the context analytics engine 204 identifies this phrase in an email message, calendar, or the like then the context analytics engine 204 determines that the workspace associated with this phrase is a candidate for migration.

Once the workspace configuration(s) 300 has been determined/generated it is stored in the configuration repository 212. It should be noted that a user can manually create a workspace configuration as well. In addition to determining contexts for workspaces, the context analytics engine 204 also analyzes the information received from the information collector 202 in conjunction with the determined workspace configurations 300 to predict which workspace of a user should be migrated, when this workspace should be migrated, and where this workspace should be migrated to. For example, by analyzing the information received from the information collector 202, such as calendar information, email/messaging information, travel reservations, social networking information, and the like, the context analytics engine 204 is able to determine a user's future workspace demand. In other words, based on the information received from the information collector 202 the context analytics engine 204 can determine whether a given user's workspace should be moved from Data Center A to Data Center B and when this migration should be performed.

The context analytics engine 204 analyzes the context of a user's future workspace demand and correlates the information received from the information collector 202 with one or more computing workspace configurations 300 in the workspace configuration repository 212 to select the workspace(s) to be migrated that match the best the context.

In one embodiment, the context analytics engine 204 also determines the time and location for the migration. For example, the context analytics engine 204 can predict where and when the user will move (travel to a new location) based on the information received from the information collector 202, as discussed above. The context analytics engine 204 uses this predicted movement schedule and geographic location and correlates it with the network topology information to determine which data center(s) is(are) close in the network to the location the user is traveling to and hence to be considered as the target/candidate data center(s) workspace should be migrated to. This network topology information is received from the network mapping module 214. Therefore, the context analytics engine 204, based on predicting when the user will travel, where the user will travel, what context/purpose the user will be traveling for, determines if migration should be performed and if so, what workspace(s) or portion(s) of the workspace(s) should be migrated, when this migration should occur, and where the workspace(s) should be migrated to.

Once this decision of whether/what/when/where to migrate is determined, the request for the migration is sent from the context analytics engine 204 to the migration scheduler 206. The migration scheduler 206 schedules the migration jobs for multiple users and determines the actual time of multiple migration requests. The decision can be aided by the network monitoring module 216 that provides information regarding the traffic patterns in the network. The migration scheduler 206 can additionally reserve the resources needed for the future migration in the target data center.

The workspace migration engine 208 performs the migration of the requested workspace to the target data center at the requested time of the migration. Alternatively, the migration job can be triggered by other real time information such as user location information 222. For example, the VWMM 112 can obtain real-time user location information 222 associated with the user such as cellular phone location information (which provides the user's geographic location), VPN log-in events/records, and the like. Even further, a user can explicitly interact with the VWMM 112 via a mobile device, desktop/notebook system, or the like through the user interface 220. This allows a user and the VWMM 112 to confirm the workspace migration, resolve any potential conflict in the scheduled migration, and/or provide any other additional information related to migrating a workspace.

The migration scheduler 206 and/or the workspace migration engine 208 can also determine in the manner in which the workspace is to be migrated by considering the constraints and the capabilities of the candidate target data centers' configuration and status 218. For example, migration scheduler 206 and/or the workspace migration engine 208 can determine whether the entire workspace is to be migrated or only a set of workspace configuration and user data can be migrated (in case the virtual workspace has been already replicated and available for use in the target data center.)

Therefore, based on the processes discussed above, the VWMM 112 is able to determine what virtual workspace(s) or portion of a virtual workspace(s) should be migrated, where this workspace should be migrated to, and when this migration should occur (e.g., the best time to perform migration before a user reaches his or her "predicted context").

For example, consider a scenario where a user has several large workspaces accessible via a data center. The user's calendar indicates that the user will travel from New York City (NYC) to Los Angeles (LA) on Monday. The calendar further indicates that the user will be meeting with a group of co-workers on a given development project for two days. It should be noted that the nature of the meeting (i.e., development project) may not always be recognizable via calendar information. Therefore, VWMM 112 can determine the context of the meeting by, for example, analyzing email/chat conversation, wikis, project pages, and the like. The VWMM 112 is then able to estimate what workspace data needs to be transferred. For example, a co-worker may already have a locally cached workspace that will aide in the meeting for a period of 2 days. Therefore, only a portion of the user's workspace data may need to be migrated. Alternatively, the decision of what workspace to migrate can be made by an analytics engine of the VWMM 112 that performs a keyword-based search through the documents describing the context (emails, calendar entry, project wiki, etc.). The VWMM 112 then identifies a matching workspace, where each workspace is tagged with a set of keywords by the user at its creation time.

The VWMM 112 also determines the data center to which the selected workspace is to be migrated to. The VWMM 112 makes this determination, in one embodiment, by analyzing networking conditions and requirements of the workspace. Also, the optimal location can be determined by analyzing the network distance between the user's work location and candidate data centers using, for example, network measurement data (for enterprise network) or Internet map service (for public network domains). Then the VWMM 112 determines when the selected workspace is to be transferred according to the predicted time of the workspace's usage (e.g., it can be transferred at a low bit-rate starting just before the time of the long flight). The decision of the migration time can also take into account other environmental information about predicted usage of the network used for the migration, such as network traffic pattern and other on-going and scheduled migration.

If a calendar conflict occurs (e.g., two meetings at the same time; one local and one in NYC), then multiple options such as explicitly asking the user which calendar entry is correct can help the system guide its migration decision. Alternatively, current context information can be used as well. For example, if a user turns on his/her cell phone in LA, then it is a clear sign that the user is actually at the LA meeting.

As can be seen the various embodiments of the present invention exploit a user's context information to make proactive and predictive judgments about virtual workspace migration. This allows for a more efficient migration system that does burden the user for explicit input, as opposed to conventional migration systems that largely focus either solely on using current context for enabling data availability or on migrating contents commonly shared by a large number of users.

Operational Flow Diagram

Figure 4:
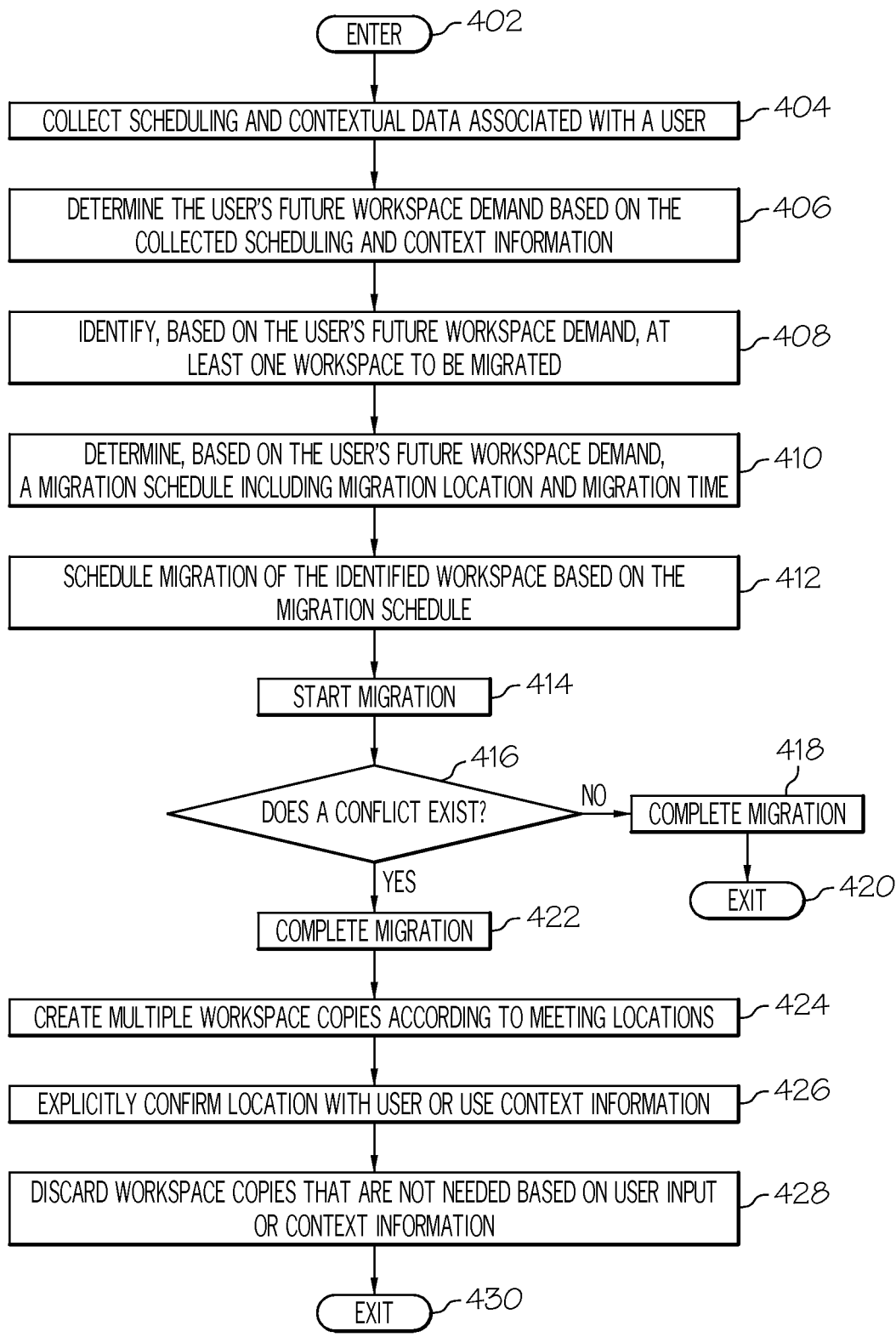
FIG. 4 is an operational flow diagram illustrating a process for predictively migrating virtual workspaces according to one embodiment of the present invention.

FIG. 4 is an operational flow diagram illustrating one process predictive virtual workspace placement. The control flow of FIG. 4 begins at step 402 and flows directly into step 404. The VWMM 112, at step 404, collects scheduling and contextual data associated with a user, as discussed above. The VWMM 112, at step 406, determines the user's future workspace demand based at least on the collected scheduling and context information. For example, based on when a user is going to travel, where the user is traveling, why the user is traveling, the activities the user will perform while traveling, the people the user is meeting with while traveling, etc., the VWMM 112 is able to predict which workspace(s) or portion (s) of a workspace(s) the user will need.

The VWMM 112, at step 408, identifies, based on the user's future workspace demand, at least one workspace to be migrated, as discussed above. The VWMM 112, at step 410, determines, based on the user's future migration demand, a predictive migration schedule that includes a migration location for migrating the workspace to and a migration time for performing the migration. Network mapping and statistics such as traffic patterns can also be monitored to predictively determine the migration schedule.

The VWMM 112, at step 412, then schedules the migration of the identified workspace based on the migration schedule. The VWMM 112, at step 414, then starts the migration according to the migration schedule. The VWMM 112, at step 416, determines if a conflict exists. If the result of this determination is negative, the workspace is migrated at step 418 and the control flow exits at step 420. If the result of this determination is positive, the VWMM 112, at step 422, migrates the workspace and creates, at step 424, multiple workspace copies at various locations based on the user's travel/context information. The migration process can also include informing a set of caches at the target destination with a set of advisories indicating a set of content to populate. The migration process can further include informing a set of proxies at the target destination of a given set of applications to load. The VWMM 112, at step 424, then queries the user to explicitly confirm the location where the user will utilize the workspace. Alternatively, the VWMM 112 can obtain the user's current location via his/her mobile device, VPN log-in records, and the like. The VWMM 112, at step 438, then discards the remaining workspace copies that are no longer needed once the user's location is confirmed. The control flow then exits at step 430.

Information Processing System

Figure 5:
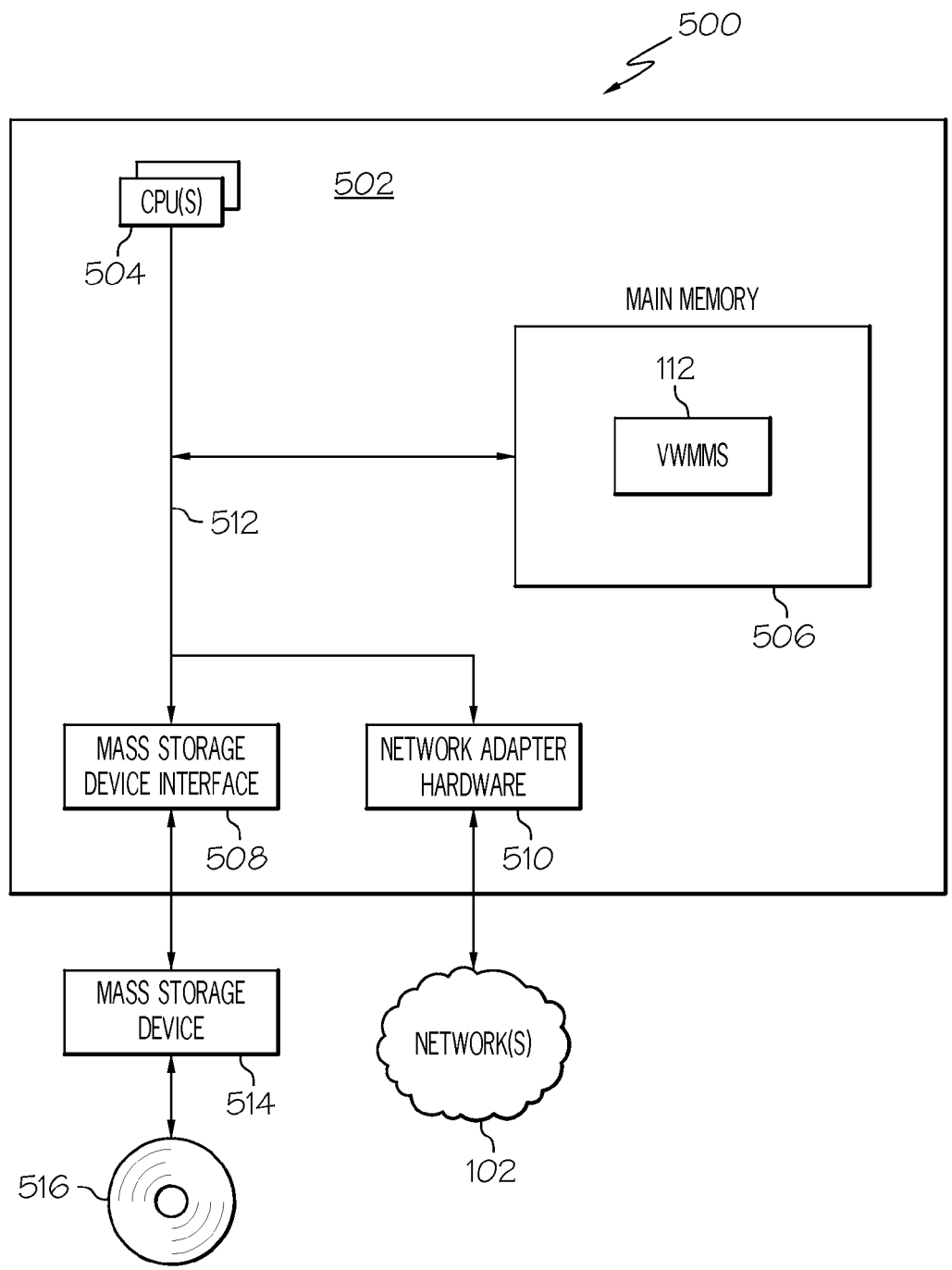
FIG. 5 is a block diagram illustrating detailed view of an information processing system according to one embodiment of the present invention.

FIG. 5 is a block diagram illustrating a more detailed view of an information processing system 500 that can be utilized in the operating environment 100 discussed above with respect to FIG. 1. The information processing system 500 is based upon a suitably configured processing system adapted to implement one or more embodiments of the present invention. Similarly, any suitably configured processing system can be used as the information processing system 500 by embodiments of the present invention.

The information processing system 500 includes a computer 502. The computer 502 has a processor(s) 504 that is connected to a main memory 506, mass storage interface 508, and network adapter hardware 510. A system bus 512 interconnects these system components. The main memory 506, in one embodiment, comprises the VWMM 112 (or at least a portion of the VWMM 112) discussed above.

Although illustrated as concurrently resident in the main memory 506, it is clear that respective components of the main memory 506 are not required to be completely resident in the main memory 506 at all times or even at the same time. In one embodiment, the information processing system 500 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the information processing system 506.

The mass storage interface 508 is used to connect mass storage devices, such as mass storage device 514, to the information processing system 500. One specific type of data storage device is an optical drive such as a CD/DVD drive, which may be used to store data to and read data from a computer readable medium or storage product such as (but not limited to) a CD/DVD 516. Another type of data storage device is a data storage device configured to support, for example, NTFS type file system operations.

Although only one CPU 504 is illustrated for computer 502, computer systems with multiple CPUs can be used equally effectively. Embodiments of the present invention further incorporate interfaces that each includes separate, fully programmed microprocessors that are used to off-load processing from the CPU 504. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 500. The network adapter hardware 510 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 516, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for managing virtual workspace migration, the method comprising:
    analyzing a set of information associated with a user, wherein the set of information comprises at least one of: emails, messages, social networking information, electronic schedule information, and social networking information;
    predicting, based on the analyzing, a future virtual workspace demand associated with the user;
    identifying, based on the analyzing, at least one virtual workspace associated with the user and the future workspace demand;
    analyzing a set of network information comprising at least network distance information between with a plurality of data centers and a predicted future location of the user;
    migrating, based on the future virtual workspace demand that has been predicted, at least a portion of the virtual workspace associated with the user from a first location to at least a second location, wherein the second location is selected based on the set of network information that has been analyzed;
    creating at least one copy of the at least a portion of the virtual workspace at one or more additional locations based on at least one the set of information associated with the user;
    receiving an indication from the user that the at least a portion of the virtual workspace is to be used at one of the first location and the one or more additional locations; and
    removing the at least a portion of the virtual workspace from one of the first location and the one or more additional locations based on the indication received from the user.

2. The method of claim 1, further comprising:
    identifying, prior to the migration, the at least a portion of at least one virtual workspace based on the set of information associated with the user.

3. The method of claim 1, wherein the migrating further comprises:
    determining a predictive migration schedule based on the analyzing, wherein the predictive migration schedule indicates at least one of a location to migrate the at least a portion of at least one virtual workspace to and a time to perform the migration.

4. The method of claim 3, wherein the migration schedule is based on at least one of:
    datacenter maintenance schedules;
    datacenter statistics;
    network mapping information; and
    network statistics.

5. The method of claim 1, wherein the migrating further comprises:
    selecting the second location based on the user's future workspace demand.

6. The method of claim 1, further comprising:
    determining, based on the analyzing, that the user is traveling to a given location; and
    migrating the at least a portion of at least one virtual workspace to the second location prior to the user arriving at the given location.

7. The method of claim 1, wherein the migrating further comprises:
    selecting a data set to move to the second location for access by the at least a portion of at least one virtual workspace.

8. The method of claim 1, wherein the migrating further comprises:
    informing a set of caches at the second location with a set of advisories indicating a set of content to populate.

9. The method of claim 1, wherein the migrating further comprises:
    informing a set of proxies at the second location of a given set of applications to load.

10. An information processing system for managing virtual workspace migration, the information processing system comprising:
    a memory;
    a processor communicatively coupled to the memory; and
    a virtual workspace migration manager communicatively coupled to the memory and the processor, wherein the virtual workspace migration manager is for:
        analyzing a set of information associated with a user, wherein the set of information comprises at least one of: emails, messages, social networking information, electronic schedule information, and social networking information;
        predicting, based on the analyzing, a future virtual workspace demand associated with the user;

identifying, based on the analyzing, at least one virtual workspace associated with the user and the future workspace demand;

analyzing a set of network information comprising at least network distance information between with a plurality of data centers and a predicted future location of the user;

migrating, based on the future virtual workspace demand that has been predicted, at least a portion of the virtual workspace associated with the user from a first location to at least a second location, wherein the second location is selected based on the set of network information that has been analyzed;

creating at least one copy of the at least a portion of the virtual workspace at one or more additional locations based on at least one the set of information associated with the user;

receiving an indication from the user that the at least a portion of the virtual workspace is to be used at one of the first location and the one or more additional locations; and removing the at least a portion of the virtual workspace from one of the first location and the one or more additional locations based on the indication received from the user.

11. The information processing system of claim 10, wherein the virtual workspace migration manager is further for:

identifying, prior to the migration, the at least a portion of at least one virtual workspace based on the set of information associated with the user.

12. The information processing system of claim 10, wherein the migrating further comprises:

determining a predictive migration schedule based on the analyzing, wherein the predictive migration schedule indicates at least one of a location to migrate the at least a portion of at least one virtual workspace to and a time to perform the migration.

13. The information processing system of claim 12, wherein the predictive migration schedule is based on at least one of:

datacenter maintenance schedules;
datacenter statistics;
network mapping information; and
and network statistics.

14. The information processing system of claim 10, wherein the virtual workspace migration manager is further for:

determining, based on the analyzing, that the user is traveling to a given location; and migrating the at least a portion of one virtual workspace to the second location prior to the user arriving at the given location.

15. A computer program product for managing virtual workspace migration, the computer program product comprising:

a non-transitory storage medium readable by a processing circuit and storing instructions for execution by the processing circuit for performing a method comprising:

analyzing a set of information associated with a user, wherein the set of information comprises at least one of: emails, messages, social networking information, electronic schedule information, and social networking information;

predicting, based on the analyzing, a future virtual workspace demand associated with the user;

identifying, based on the analyzing, at least one virtual workspace associated with the user and the future workspace demand;

analyzing a set of network information comprising at least network distance information between with a plurality of data centers and a predicted future location of the user;

migrating, based on the future virtual workspace demand that has been predicted, at least a portion of the virtual workspace associated with the user from a first location to at least a second location, wherein the second location is selected based on the set of network information that has been analyzed;

creating at least one copy of the at least a portion of the virtual workspace at one or more additional locations based on at least one the set of information associated with the user;

receiving an indication from the user that the at least a portion of the virtual workspace is to be used at one of the first location and the one or more additional locations; and removing the at least a portion of the virtual workspace from one of the first location and the one or more additional locations based on the indication received from the user.

16. The computer program product of claim 15, wherein the method further comprises:

identifying, prior to the migration, the at least a portion of at least one virtual workspace based on the set of information associated with the user.

17. The computer program product of claim 15, wherein the migrating further comprises:

determining a predictive migration schedule based on the analyzing, wherein the predictive migration schedule indicates at least one of a location to migrate the at least a portion of at least one virtual workspace to and a time to perform the migration.

18. The computer program product of claim 17, wherein the predictive migration schedule is based on at least one of:

datacenter maintenance schedules;
datacenter statistics;
network mapping information; and
network statistics.

19. The computer program product of claim 15, wherein the migrating further comprises:

selecting the second location based on the user's future workspace demand.

20. The computer program product of claim 15, wherein the method further comprises:

determining, based on the analyzing, that the user is traveling to a given location; and migrating the at least a portion of at least one virtual workspace to the second location prior to the user arriving at the given location.

* * * * *